USO05455825A

United States Patent [19]
Lauer et al.

[11] Patent Number: 5,455,825
[45] Date of Patent: Oct. 3, 1995

[54] TAG-BASED SCHEDULING SYSTEM FOR DIGITAL COMMUNICATION SWITCH

[75] Inventors: Hugh Lauer, Concord; Chia Shen, Somerville, both of Mass.; Abhijit Ghosh, Berkeley, Calif.

[73] Assignee: Mitsubishi Electric Research Laboratories, Cambridge, Mass.

[21] Appl. No.: 234,385

[22] Filed: Apr. 28, 1994

[51] Int. Cl.$^6$ .................................................. H04L 12/56
[52] U.S. Cl. ........................................................... 370/60
[58] Field of Search ................... 370/60, 60.1, 94.1, 370/85.6; 340/825.5, 825.51, 825.52

[56] References Cited

U.S. PATENT DOCUMENTS 5,208,805  5/1993  Ochiai ................................. 370/85.6

Primary Examiner—Douglas W. Olms
Assistant Examiner—Dang Ton
Attorney, Agent, or Firm—Robert K. Tendler

[57] ABSTRACT

A switch for digital communication networks includes a queuing system capable of implementing a broad class of scheduling algorithms for many different applications and purposes, with the queueing system including means for providing numerical tags to incoming cells or packets, the values of the tags being calculated when incoming cells or packets arrive at the switch. A queue and search module is provided to select cells or packets for transmission based on these tags. The combination of the tags and the queue and search module enables simple and fast implementations of a wide variety of scheduling algorithms, including algorithms for supporting communication traffic with real time requirements, continuous media such as audio and video, and traffic requiring very fast response. Furthermore, multiple classes of traffic are supported in a single network switch, each class having its own scheduling algorithm and policy. The queue and search module is designed for VLSI implementation, and in one embodiment supports an ATM switch with 16 ports, each port operating at 622 megabits per second.

22 Claims, 8 Drawing Sheets

TAG-BASED SCHEDULING SYSTEM FOR DIGITAL COMMUNICATION SWITCH

FIELD OF THE INVENTION

This invention relates to digital communication networks in which cells or packets traverse a network from node to node, and more particularly to a digital communication network switch having an improved system for scheduling the order that cells are transmitted from one node to the next in the network.

BACKGROUND OF THE INVENTION

In general, digital communication networks are utilized in which messages or streams of information are subdivided into sequences of small units called packets or cells, in which such cells or packets are transmitted from node to node, and in which at each node a switch selects both the order of transmitting such cells or packets and the next node to which they are to be transmitted, so that in such networks the digital information reaches its ultimate destination in a timely manner. It is desirable that these network switches be capable of supporting network traffic of various characteristics including traffic requiring hard real-time guarantees of timely delivery, continuous media traffic for audio and video, and traffic requiring very rapid response.

One important kind of digital communications network is called an ATM or Asynchronous Transfer Mode network. ATM networks provide for the transmission of data from one point or node in the network to one or more other points or nodes by the subdivision of the data or information into sequences of small cells of fixed size which are then transmitted through the network from node to node. Such nodes include ATM switches which provide fast packet or cell switching and routing between nodes of the network. General principles of ATM networks are described in articles by J. Bryan Lyles and Daniel C. Swinehart, "The Emerging Gigabit Environment and the Role of Local ATM," IEEE Communications Magazine, vol. 30, #4, April 1992, pp. 52–58, and by C. Lamb, "Speeding to the ATM," Unix Review, vol. 10, #10, October 1992, pp. 29–36.

One of the major problems with ATM networks is the problem of scheduling of cells to be transmitted by each switch. The cells are in general buffered at each switch in queues. Assuming no congestion, these cells are received from an incoming link at a switch and immediately transmitted over an outgoing link to another destination. However, when cells arrive over multiple input links and must be transmitted onto the same output link at the same time, it is necessary to form a queue of cells so that they can be transmitted in the desired order.

In order to accommodate the scheduling of which cells are to be transmitted at what time and in what order, it is common to utilize a First In-First Out, FIFO, ordering system in which the first cell to arrive at the switch is transmitted prior to subsequently arriving cells. In the case of networks which support real time applications, cells are also typically assigned priorities and stored in separate queues by priority. Subsequently, cells are transmitted in the order dictated by the priorities of the separate queues. It will be appreciated that these simple systems can only support a limited number and class of real time applications, because the FIFO and priority scheduling mechanisms can only provide limited guarantees of timely transmission without loss of data.

For instance, first generation switches for ATM local and wide area networks provide very simple scheduling algorithms for scheduling and dispatching communication traffic from incoming to outgoing network links. Traffic is handled in FIFO order according to the ATM rules, but a small number of priority levels, usually two, are provided to support applications with real-time communication requirements in a very limited way. Unfortunately, a handful of statically assigned priorities is barely adequate for even moderate-sized local area networks with a lot of advanced, rapidly evolving applications. Furthermore, when applications need to transmit continuous media, such as audio and video, or when they need predictable response in real time, it is virtually impossible to make any kind of predictions or guarantees about the quality and timeliness of network service.

Over the past two decades, there has been considerable research in real time and multi-media computing and communication, and many scheduling algorithms have been invented and studied in great detail. For instance, J. Jungok Bae and T. Suda, in an article entitled "Survey of Traffic Control Schemes and Protocols in ATM Networks," Proceedings of the IEEE, vol. 79, No. 2, February 1991, pp. 170–189, describe a large number of traffic control schemes which must be accommodated by any general purpose scheduling mechanism in an ATM switch. Moreover, H. Zhang, et. al., describe rate-based service disciplines and rate controlled static-priority queuing in the following papers: H. Zhang and S. Keshav, "Comparison of RateBased Service Disciplines," Proceedings of ACM SIGCOMM '91, Zurich, September, 1991, and H. Zhang and D. Ferrari, "Rate-Controlled Static-Priority Queueing," International Computer Science Institute Tech. Report #TR-92-003, Berkeley, Calif. Further examples of scheduling algorithms can be found in the following papers and articles: W. A. Horn, "Some Simple Scheduling Algorithms," Naval Research Logistic Quarterly, Vol. 21, 1974, pp. 177–185; J. R. Jackson, "Scheduling a Production Line to Minimize Maximum Tardiness," Management Science Research Project, Research Report 43, UCLA, January 1955; C. R. Kalmanek, H. Kanakia, S. Keshav, "Rate controlled servers for very high-speed networks, "IEEE Global Telecommunications Conference, San Diego, Calif., December 1990, pp. 300.3.1–300.3.9; A. Kumar, J. Parekh, "A Generalized Processor Sharing Approach to Flow Control in Integrated Services Networks," PhD dissertation, MIT, February 1992; H. T. Kung, A. Chapman, "The FCVC (Flow-Controlled Virtual Channels) Proposal for ATM Networks," Proceeding of 1993 International Conference on Network Protocols, San Francisco, Calif., Oct. 19–22, 1993; C. L. Liu and J. W. Layland, "Scheduling Algorithms for multiprogramming in a Hard-Real-Time Environment," Journal of ACM, vol. 20, No. 1, 1973; L. Zhang, "Virtual Clock: A new traffic control algorithm for packet switching networks," in Proceedings ACM SIG-COMM, Philadelphia, Pa., September 1990. pp. 19–29; L. Zhang, "Virtual Clock: A new traffic control algorithm for packet-switched networks," ACM Transactions on Computer Systems, vol. 9, No. 2, May 1991, pp 101–124; Q. Zheng, K. Shin, "On the Ability of Establishing Real-time Channels in Point-to-Point Packet-switched Networks," IEEE Transactions on Communications, March 1994.

Note that most of these algorithms have been considered inappropriate for implementation in ATM networks, partly because they require slow searches of queues and partly because they are too specialized for general purpose environments.

However, one type of VLSI Sequencer Chip for ATM scheduling is described in a paper by H. Jonathan Chao and Necdet Uzun, "A VLSI Sequencer Chip for ATM Traffic Shaper and Queue Manager," IEEE Journal of Solid-State Circuit, Vol. 27, No. 11, November 1992. In this system, cells are switched to output ports, each of which contains its own queue and sequencer chip, where such cells are sorted by the sequencer chip into priority order. While this provides for an improved implementation of priority scheduling, it requires separate sorting circuitry for each output port of the switch, resulting in increased cost, decreased flexibility in switch design and potential limitations of performance.

One significant enhancement of ATM switches involving shared-buffer scheduling is described in two papers by H. Kondoh, et al, and K. Oshima, et al: H. Kondoh, H, Yamanaka, M. Ishiwaki, Y. Matsuda, and M. Nakaya, "An Efficient Self-Timed Queue Architecture for ATM Switch LSI's," Custom Integrated Circuit Conference, San Diego, May 1994; and K. Oshima, H. Yamanaka, H. Saito, H. Yamada, S. Kohama, H. Kondoh, Y. Matsuda, "A New ATM Switch Architecture based on STS-type Shared Buffering and its LSI Implementation," Proceedings of International Switching Symposium '92, Yokohama, Japan, October 1992, pp. 359–363. The key element of this ATM switch design is common queuing, shared buffers to improve statistical multiplexing, and both faster performance and lower cost. This switch is distinguished from other ATM switches which use output buffering, in that input cells from all input ports are deposited directly into a common buffer memory. Output is selected on a FIFO or simple priority basis. While this switch operates satisfactorily for long distance telecommunications with simple priority requirements, there is no control of the queuing to support real time applications such as factory automation, power plant control, and full-motion video.

SUMMARY OF INVENTION

In order to accommodate a large class of scheduling algorithms, a digital communications network switch includes an improved scheduling system in which each cell is tagged as it arrives at the switch, after which it is inserted into a common queue. Tags are binary numbers calculated according to the scheduling algorithm for the class of traffic involved, attributes of the virtual channel on which the cell is transmitted, and the properties of the cell itself. Subsequently, the queue is searched in parallel by destination and tag for the entry with the smallest tag for the corresponding destination, output link, or port. By this means, the switch always selects the first cell specified by that scheduling algorithm for that destination.

More generally, the Subject System includes means for storing an algorithm which determines the order by which cells are scheduled, with the algorithm being changeable prior to or during operation of the switch to accommodate a wide range of traffic requirements for the network.

The switch is capable of supporting both static and dynamic algorithms, including the rate monotonic algorithm of Liu and Zhang, the simple priority algorithm of Zhang, the Weighted Fair Queueing algorithm of Kumar, the Earliest Deadline First algorithm of Jackson, Liu, Horn, and Zheng, the Virtual Clock algorithm of Zhang, the Round Robin and Hierarchical Round Robin of Kalmanek mentioned above, as well as sophisticated control algorithms such as the Flow Controlled Virtual Channels algorithm of Kung.

The generality of the Subject Invention derives from first, that the tag values can be calculated according to any computable function, second, that the tag values represent the order in which cells are to be transmitted, and third, that all of the algorithms listed above have the characteristic that their cell ordering can be represented as numerical tags. The only determining factor in the search is the numerical value of the tag, as opposed to its meaning. Moreover, because these tags are calculated on-the-fly for each cell, they can support both dynamic as well as static scheduling algorithms. The number of bits in each tag is sufficiently large to support reordering of the total number of cells in the switch buffer.

The essence of the Subject queuing system is tag-based search. Upon arrival at a network switch, each ATM cell is annotated with a tag containing a binary number. A typical embodiment involves tags with 8, 16, or more bits, thereby allowing 256, 65536, or more possible tag values. The tag for each cell encapsulates the relevant information about the virtual channel on which that cell is transmitted, the scheduling algorithm for the class of traffic on that virtual channel, and properties of the cell itself. Then the cell, the tag, and the destination information are appended to the tail of the queue of cells awaiting transmission. In preferred embodiments, the queue is implemented in VLSI circuitry.

Finally, when the switch is ready to transmit a cell to a particular destination, all entries of the queue are searched in parallel for the entry containing the smallest tag that also matches that destination. This entry is then removed and transmitted. If there are multiple entries in the queue with the same tag, then the one that arrived earliest is selected. The queue search circuit identifies not only the minimum tag but also the output port to which the cell will be transmitted.

With this architecture, it is possible to implement a very large class of scheduling algorithms, both static and dynamic, including all of those listed above. By assigning ranges of tag values, it is also possible to implement different scheduling algorithms for different classes of traffic in the same switch at the same time. This is accomplished at the time of tag calculation by assigning the tags of a higher priority class to a lower range, while assigning the tags of a lower priority class to a higher range. It will be appreciated that the numerical search system will always choose cells of the higher priority class if any are present because their tags have smaller numerical values than any cells of the lower priority class.

In summary, to implement a broad class of cell scheduling algorithms beyond but including FIFO and simple priority schemes in an ATM network, a general purpose queuing system for an ATM network switch includes the utilization of tag-based search in which upon arrival at a network switch, each ATM cell is annotated with a tag containing a binary number, with the tag encapsulating the relevant information about the virtual channel on which the cell is transmitted, the scheduling algorithm for the class of traffic on that virtual channel, and the properties of the cell itself. The cell, the tag, and the destination information are appended to the tail of the queue of cells awaiting transmission. When the switch is ready to transmit a cell to a destination, all entries of the queue are searched in parallel for the entry containing the smallest tag that also matches that destination, with this entry being removed and transmitted. In the case of multiple entries in the queue with the same tag, the entry that arrived earliest is selected, with the queue search circuit identifying not only the minimum tag but also the output link to which the cell will be transmitted. Thus each entry in a switch queue is augmented with a tag containing a binary number such that the queue can be rapidly searched to find the entry with the smallest tag value for each particular destination. The architecture makes it possible to implement nearly all published scheduling and dispatching algorithms for supporting network traffic of various characteristics, including algorithms supporting hard realtime guarantees, continuous media, and very rapid response. Furthermore, the architecture supports multiple classes of traffic in the same network, each with its own scheduling and dispatching policies and algorithms.

BRIEF DESCRIPTION OF THE DRAWING

These and other features of the Subject Invention will be better understood taken in conjunction with the Detailed Description in conjunction with the Drawings of which.

DETAILED DESCRIPTION

Figure 1:
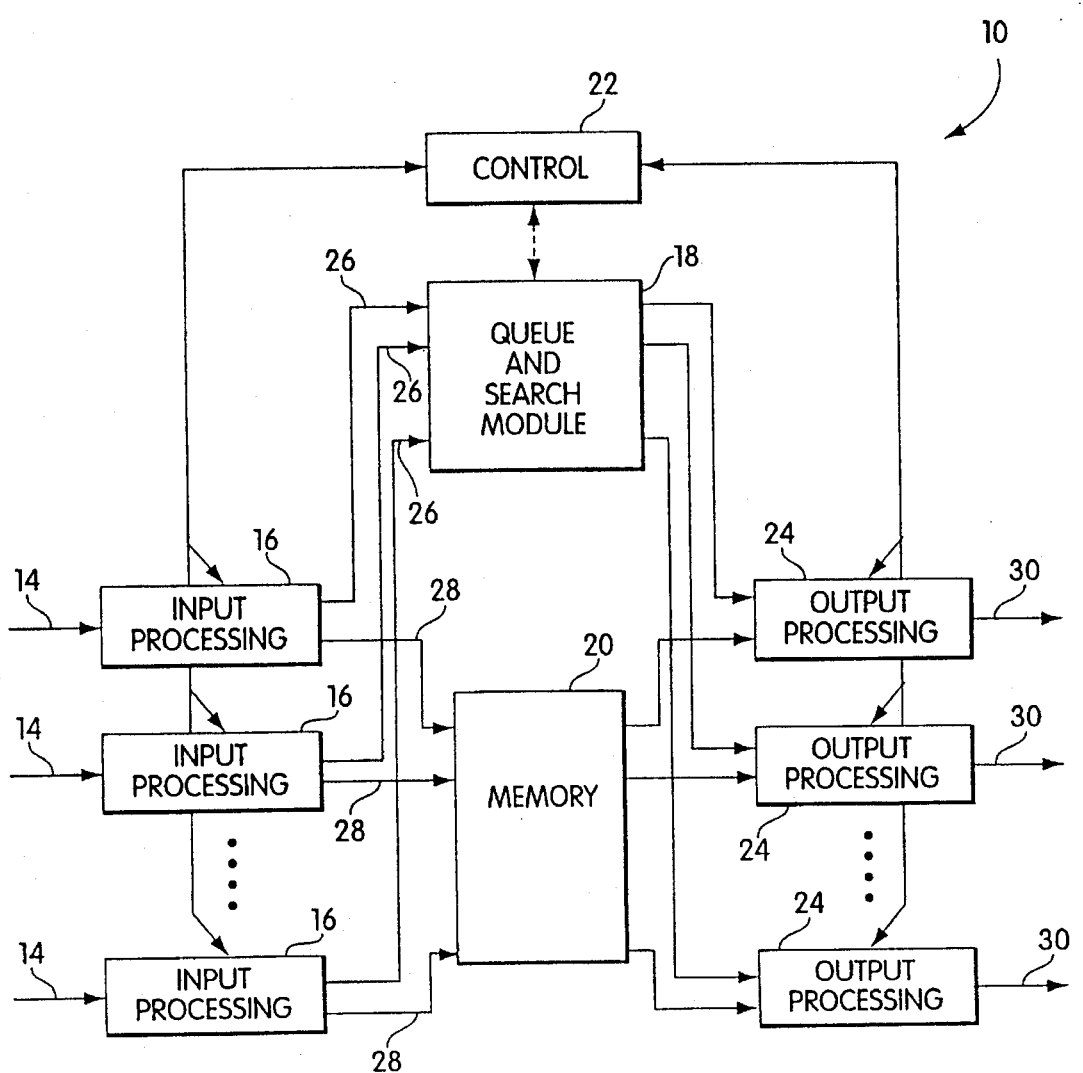
FIG. 1 is a block diagram illustrating the logical architecture of the Subject ATM switch, showing a queue and search module under the control of a control unit.

Referring now to FIG. 1, an ATM Switch 10 is provided with incoming links 14, which are coupled to input processing modules 16, the outputs of which are respectively applied to a queue and search module 18 and a cell buffer memory 20. The queue and search module 18 is under control of a control unit 22, which, inter alia, controls input processing modules 16, as well as output processing modules 24. Each input processing module 16 and output processing module 24 includes a microprocessor and memory or other means by which it can be configured or re-configured by control unit 22 to compute any algorithm appropriate to the requirements of the network for each cell arriving or leaving the switch.

The outputs of queue and search module 18 are applied to respective output processing modules 24, as are the outputs of cell buffer memory 20. As illustrated at 26, the output of input processing module 16 contains destination information, tags, and buffer addresses, which are coupled to queue and search module 18. Additionally, as illustrated at 28, cell headers and bodies are coupled to cell buffer memory 20.

In operation, a cell arrives at an input processing module 16 via an input link 14. Input processing module 16 performs cell-by-cell processing on the arriving cell. In addition to the normal housekeeping functions required in every ATM switch, input processing module 16 computes a tag value for each cell according to the scheduling algorithm for the virtual channel of the cell. The tag value is also based on the state of that channel and arrival time of the cell. By virtual channel is meant the end-to-end connection of a particular stream of data, separate from all other streams of data. In an ATM network, it is identified by a field of bits in the header of the cell. Input processing module 16 also computes and updates the status information of the virtual channel and other information maintained by the switch.

Following the calculation, the tag, the destination information, and the buffer address of the cell are coupled to queue and search module 18, where they are stored in the queue. The cell header and cell data are coupled to cell buffer memory 20. At this point, the address, destination, and tag of the cell are now in the queue, and its cell header and data are stored in the cell buffer memory. Input processing module 16 is then free to accept and begin processing the next cell. Therefore, the input processing must be completed within the time allotted to one cell cycle of the corresponding input link 14, that is the time required to receive an ATM cell at the bandwidth of the input link.

Under control of control unit 22, the queue and search module searches the queue in turn for a cell with destination bits corresponding to each output processing module 24. Output processing module 24 performs any remaining calculations required before the cell can be transmitted. It then transmits the cell over output link 30 to another node in the network or to its ultimate destination. The searching accomplished by the queue and search module 18 must be completed for all output processing units within the time allotted to one cell cycle of the fastest associated input link 14 and output link 30 of the switch.

Figure 2A:
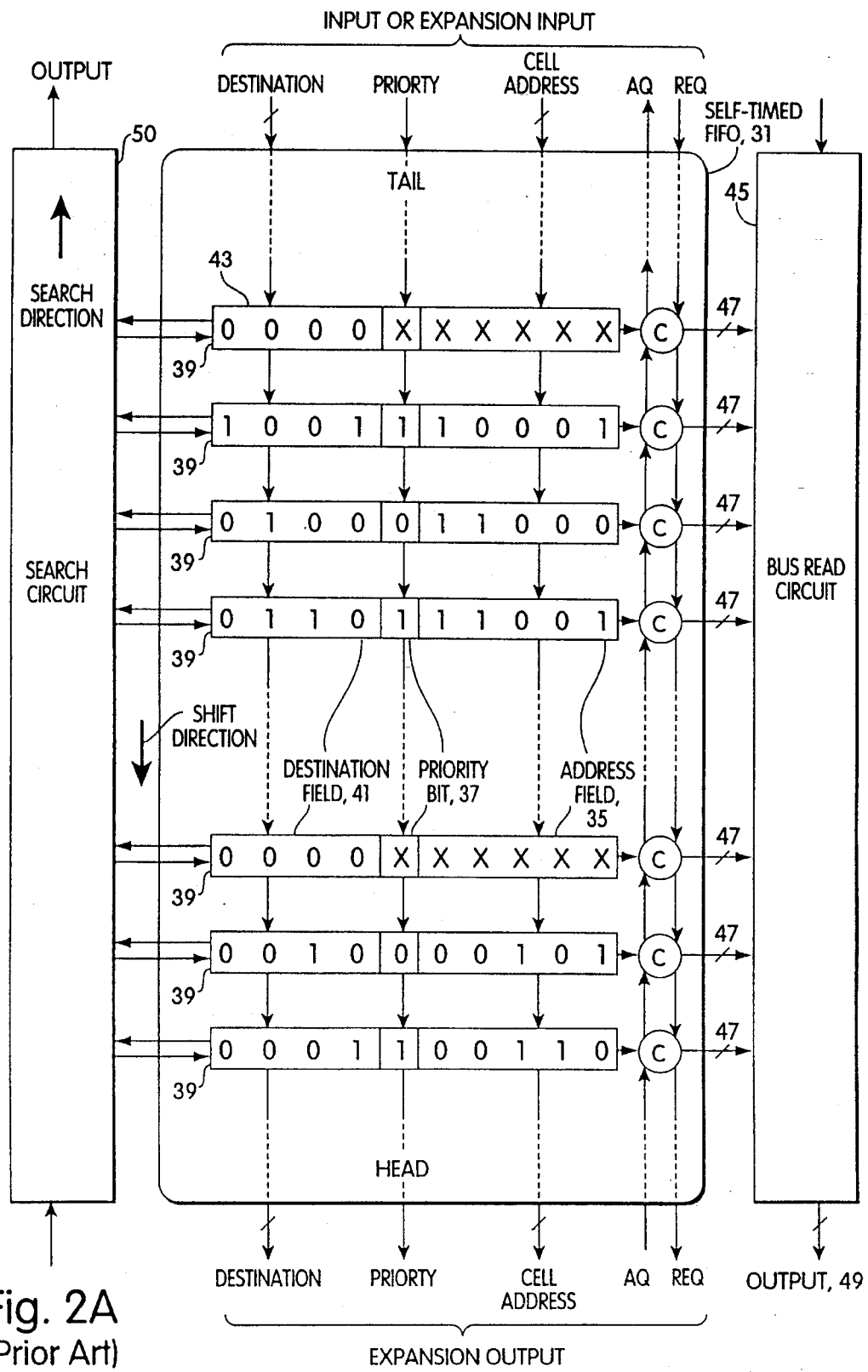
FIG. 2A is a block diagram of a prior art queue and search system implemented by Kondoh et al showing a FIFO for storing the queue, registers in the FIFO for representing each cell in the queue, a search circuit for selecting cells from the queue which match particular destinations, and a bus read circuit for reading out information from the queue.

Prior to describing the Subject queue and search system, and referring now to FIG. 2A, a simplified prior art search circuit is now described, which would ordinarily be the embodiment of module 18 in FIG. 1. The queue of module 18 is contained in a self-timed VLSI FIFO circuit 31. Queue entries are inserted into the tail of the FIFO 31 and automatically shift forward toward the head of the queue to occupy unused entries of the FIFO. Each queue entry is in a register 39 and contains a destination field 41, an address field 35, and a priority bit 37. Each destination field 41 contains a series of independent binary bits which each have a value of either one or zero, depending on which output links the data is to be transferred or coupled to. There are as many destination bits as there are output links 30 of the switch, each bit representing the connection to one particular output link. A connection is made from the queue entry to an output link when the corresponding bit in the destination field of that queue entry has the value one. For instance, a one in the third position of the destination field means that the corresponding data is to be transmitted to the third output link.

When viewing the entire queue from head to tail, a vertical column represents one output link for all cells or queue entries. Thus by searching for a one or a zero in each column, it is possible to ascertain if the cell is to be transmitted or coupled to this output link. In terms of multicast, when one cell is coupled to more than one output link, it will be appreciated that there will be a number of ones in the destination field of the cell. Note, in the example of FIG. 2A, there are two cells having the same destination as indicated by the ones in the rightmost column of the destination field. It is the purpose of any scheduling algorithm to establish the order of transmission of these cells to a given output link, which in the prior art, is established by priority bit 37.

Thus whenever a bit within destination field 41 of a particular entry 39 has the value one, the cell in buffer memory 20 at the address identified in the address field 35 of that entry must be transmitted to the output link corresponding to that bit. By this means, the destination bits are capable of identifying cells that must be transmitted to one or more than one output link. If all of the bits of a destination field 41 are zero, as in entries 43, then that entry is deemed to be unused. Also shown in FIG. 2A are a search circuit 50 and a bus read circuit 45.

In operation, when control module 22 commands queue and search module 18 to search for a cell to transmit to an output link 30, it does so by specifying the corresponding bit position of destination field 41. Search circuit 50 then selects the queue entry 39 which is nearest to the head of the queue and which has a value of one in the corresponding bit position. Control module 22 then causes the cell address field 35 of the selected entry to be coupled to the bus read circuit 45, where it is coupled to the output 49 of the queue and search module 18. The corresponding destination bit of the selected entry is also reset to the value zero. Finally, the output processing module 24 uses the address on output lines 49 to select the cell for transmission from the cell buffer memory 20.

Figure 2B:
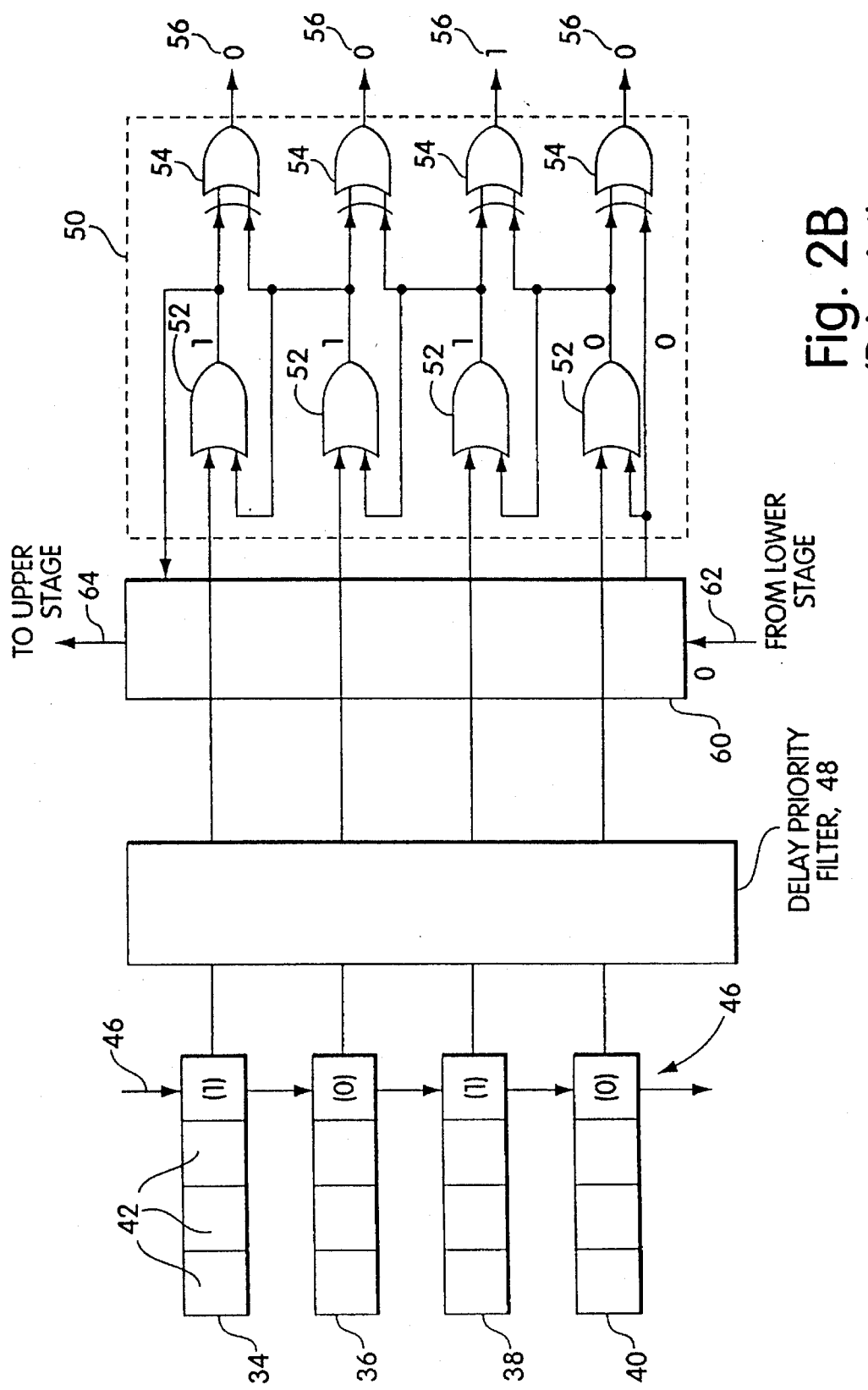
FIG. 2B is a schematic diagram of four queue entries of the prior art FIFO of FIG. 2A showing the detail of the destination bits and search circuit, along with a delay priority filter.

Referring now to FIG. 2B, this figure illustrates four queue entries 39 of FIG. 2A, showing just destination bits 42 in destination field 41. Also shown is a delay priority filter 48 which incorporates priority bit 37. When queue and search module 18 is commanded to select a cell for a particular output link 30, it does so by selecting one column 46 of destination bits. This column is applied to a delay priority filter 48 which contains one priority bit representing two priorities for each entry of the queue. When an output link is selected, the bits from the corresponding column of the destination bits are coupled to filter 48 to produce a set of zero and one values, with zero values indicating that the corresponding cell does not qualify for selection; and one values indicating that the corresponding cell does qualify for selection. Thus filter 48 performs a simple prioritization function with exactly two priorities. In the prior art, the purpose of utilizing a delay priority filter was to provide a means for selecting some cells ahead of other cells with the same destination. More specifically, the delay priority filter establishes a high priority and a low priority and enable the high priority cells to be transmitted ahead of the low priority cells.

The output of filter 48 is a set of bits applied to a comparison circuit 50 which compares the bit of each entry with those of its immediate neighbors. This is accomplished by the OR gates 52 and the exclusive OR gates 54 as illustrated. The result is that at most one of the output bits 56 has the value one, indicating that the corresponding entry has been selected for transmission. The selected entry is always the entry nearest the head of the queue for which the destination bit has the value one.

As can be seen, an accelerator 60 is utilized to speed up the search, so that all output links can be selected in turn within one cell cycle. Accelerator 60 is a conventional look-ahead circuit having an input 62 from a lower stage with its output 64 coupled to an upper stage.

Figure 3:
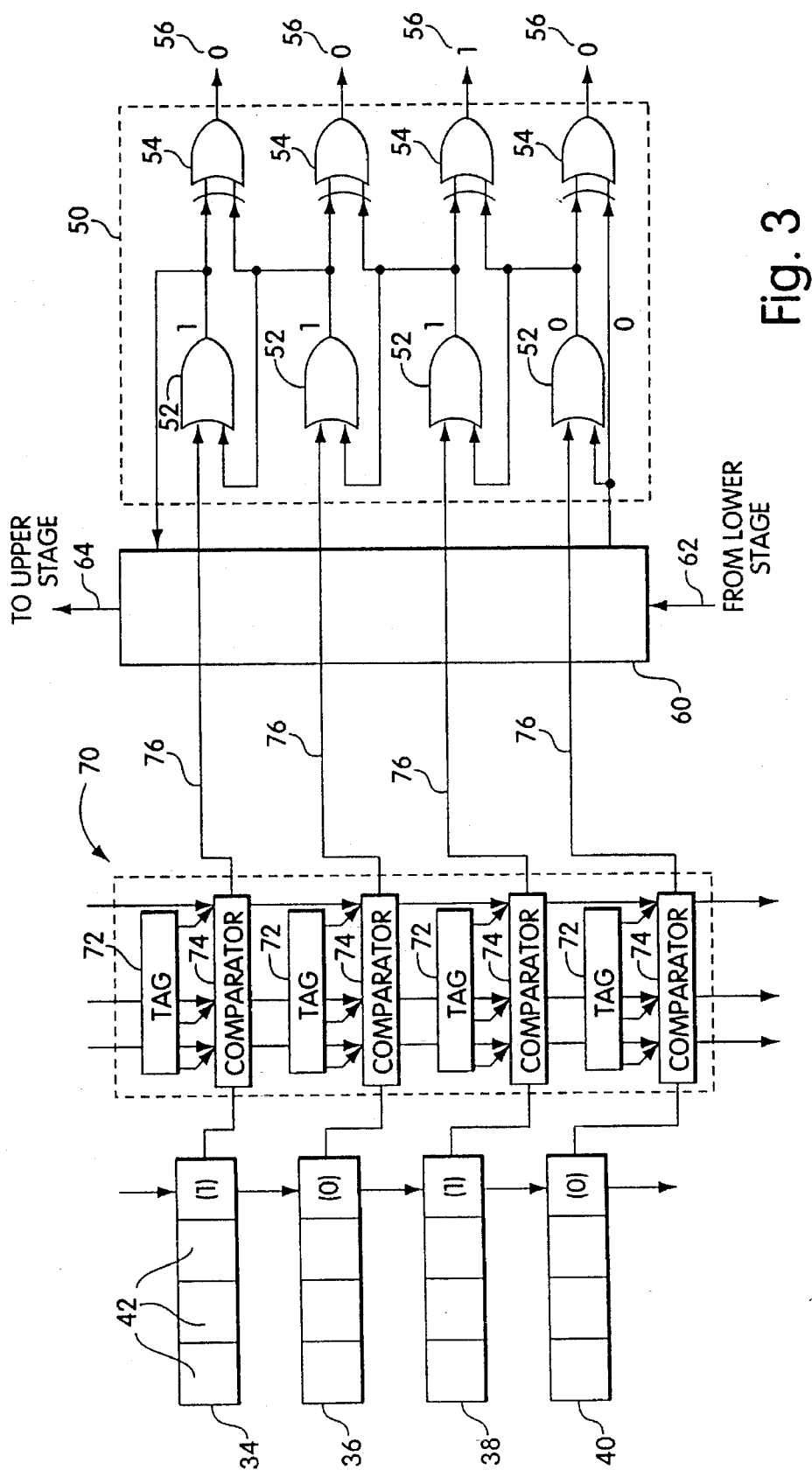
FIG. 3 is a schematic diagram illustrating four queue entries of one embodiment of the Subject System in which the delay priority filter of the system of FIG. 2B is replaced with a linear search module in which calculated tag values are selected.

Referring now to FIG. 3, the delay priority filter 48 of FIG. 2 is replaced in the Subject Invention with a linear search circuit module 70. In this embodiment, each entry 39 of the queue is extended with a tag field 72 along with a comparator 74. The tag field is given a value corresponding to a number, the magnitude of which is used to establish priority. In the Subject Invention, cells with the smallest tag values are given highest priority. As mentioned above, it is the numerical value of the tag which is used to establish priority. The purpose of linear search module 70 is to provide a different selection function as opposed to the simplified function provided by filter 48 of FIG. 2B. This function is that which provides the flexibility to accommodate the broad class of scheduling algorithms. It will be appreciated that tag registers 72 with their respective comparators 74 represent only four example entries of a queue which may contain hundreds of entries. Each tag register contains a binary number embodying the tag value for the corresponding cell entry calculated from input processing module 16 of FIG. 1. This number is compared at comparator 74 with the output of the comparator of the next previous tag comparator in the queue. The result of the comparison determines the smaller of these two numbers, which is in turn passed on to the next following comparator in the queue.

The result of this ordering process is a series of bits on output lines 76, such that a value of one for any of these bits indicates first that the selected destination bit for the corresponding queue entry is one, and second that the tag value of the corresponding queue entry is smaller than the tag values of all other queue entries toward the tail of the queue for which the selected destination bit is also one. Therefore, it will be seen that the output bits 56 of the linear search circuit comprised of module 70, comparison circuit 50, and accelerator 60, select at most one queue entry among all of those with the selected destination bit set to one, and that the selected entry will have the smallest tag value. It will also be appreciated that if two or more queue entries have the same smallest tag value and destination bit, the entry which is nearest the head of the queue will be selected.

As a result, module 70 provides a unique opportunity to tailor the selection process based on the tag values calculated according to whatever scheduling algorithm is appropriate. It is this flexibility which permits a general purpose search system for ATM switches.

More particularly, in order to implement tag-based searching, the Subject System replaces the delay priority filter with a tag register for each entry in the queue, along with a comparator to compare each tag field with the minimum value of the other tags toward the tail of the queue. In the following example, k is the number of bits in each tag register, and N is the total number of entries in the queue. As illustrated in FIG. 3, running between each pair of tags, $T^{i+1}$ to $T^i$, is a set of wires $M^i$. The outputs of the comparison circuit for entry i are the value $M^i$ to the next queue entry, and one bit $C^i$, indicating whether or not the destination bit $D^i$ is set, and if so whether or not $T^i$ is less than or equal to $M^{i+1}$.

The value of $M^N$ from the last entry of the queue is set to either the value $T^N$, in the case that destination bit $D^N$ is set to one, or the binary value $2^k-1$, in the case that $D^N$ is zero. As a result, each set of wires $M^i$ contains the value of the smallest tag for all entries i through the end of the queue, and each $C^i$ has a value of one if and only if $D^i$ is set and its tag is at least as small as all of the tags behind it in the queue. The output values $C^i$ replace the outputs of the Delay Priority Filter of the prior art circuit of FIGS. 2A and 2B. Note the search circuit merely selects the first qualifying entry with $C^i$ set to one—i.e., the entry with the smallest tag.

Figure 7:
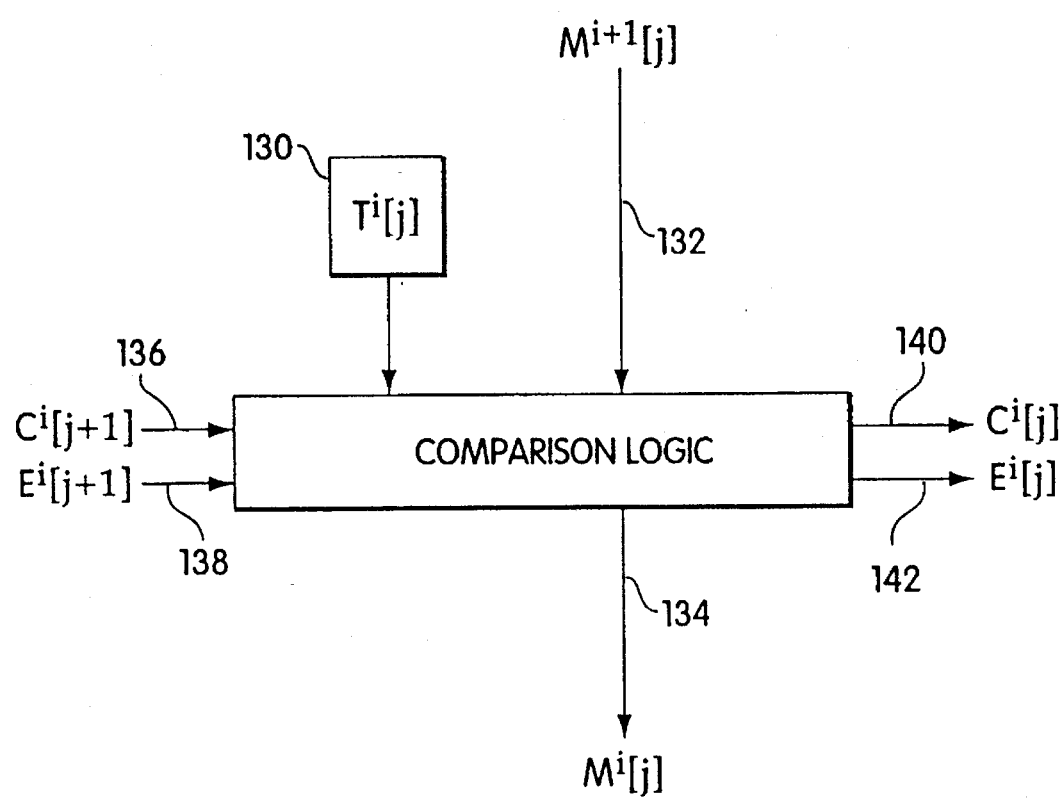

A detailed description of the operation of the comparator and a proof of its correctness are given below. The operation of the comparator for each bit of a tag field is illustrated by FIG. 7 and Table 1. The box 130 in FIG. 7 labeled $T^i[j]$ is the bit in position j of the tag register for the i-th entry, the wire 132 labelled $M^{i+1}[j]$ is the j-th bit of the value $M^{i+1}$ coming from the next entry toward the tail of the queue, and the wire 134 labelled $M^i[j]$ is the j-th bit of the value $M^i$ leading away from this entry toward the head of the queue. The two wires 136 labelled $C^i[j+1]$ and 138 labelled $E^i[j+1]$ are carry bits coming from the (j+1)st bit of the i-th entry, and the two wires 140 labelled $C^i[j]$ and 142 labelled $E^i[j]$ are carry bits leading to the next lower order bit of the i-th entry.

The meaning of the two carry bits and the wires is defined as follows:

$C^i[j]=1$ if and only if $D^i=1$ and $T^i[(k-1)\ldots j] \leq M^{i+1}[(k-1)\ldots j]$ (1)

$E^i[j]=1$ if and only if $D^i=1$ and $T^i[(k-1)\ldots j]=M^{i+1}[(k-1)\ldots j]$ (2)

$M^i[(k-1)\ldots j]=\min\{2^k-1, T^m[(k-1)\ldots j]$ for $m=i,\ldots,N$, such that $D^m=1\}$ (3)

where N is the number of entries in the queue and where the notation $T^i[(k-1)\ldots j]$ means the binary number represented by the (k-j) high order bits of the quantity $T^i$. The function of the comparator is defined by the logic values in Table 1.

Note that Row 5 represents an illegal combination of $C^i[j+1]$ and $E^i[j+1]$. To prove that the comparator of Table 1 actually finds the minimum, first let $C^i[k]=E^i[k]=D^i$ and

TABLE 1

|   | $C^1[j+1]$ | $E^1[j+1]$ | $T^1[j]$ | $M^{i+1}[j]$ | $M^1[j]$ | $C^1[j]$ | $E^1[j]$ |
| --- | --- | --- | --- | --- | --- | --- | --- |
| 1 | 0 | 0 | 0 | 0 | 0 | 0 | 0 |
| 2 | 0 | 0 | 0 | 1 | 1 | 0 | 0 |
| 3 | 0 | 0 | 1 | 0 | 0 | 0 | 0 |
| 4 | 0 | 0 | 1 | 1 | 1 | 0 | 0 |
| 5 | 0 | 1 | x | x | x | x | x |
| 6 | 1 | 0 | 0 | 0 | 0 | 1 | 0 |
| 7 | 1 | 0 | 0 | 1 | 0 | 1 | 0 |
| 8 | 1 | 0 | 1 | 0 | 1 | 1 | 0 |
| 9 | 1 | 0 | 1 | 1 | 1 | 1 | 0 |
| 10 | 1 | 1 | 0 | 0 | 0 | 1 | 1 |
| 11 | 1 | 1 | 0 | 1 | 0 | 1 | 0 |
| 12 | 1 | 1 | 1 | 0 | 0 | 0 | 0 |
| 13 | 1 | 1 | 1 | 1 | 1 | 1 | 1 |

$M^N[j]=T^N[j]$ or $\neg D^N$), for $j=,\ldots,k-1$

Then equations (1) and (2) are trivially true for all i and for j=k. Similarly, equation (3) is trivially true for i=N and for all j=0, ..., k-1. Now let us proceed by induction. Consider the bit $T^i[j]$ for some $0 \leq j < k$, $1 \leq i < N$. Assume that the induction hypothesis is satisfied for all values above and to the left of i, j (in FIG. 7). Then by this hypothesis $C^i[j+1]=1$ if and only if $D^i=1$ and $T^i[(k-1)\ldots (j+1)] \leq M^{i+1}[(k-1)\ldots (j+1)]$ (4)

$E^i[j+1]=1$ if and only if $D^i=1$ and $T^i[(k-1)\ldots (j+1)]=M^{i+1}[(k-1)\ldots (j+1)]$ (5)

$M^i[(k-1)\ldots (j+1)]=\min\{2^k-1, T^m[(k-1)\ldots (j+1)]$ for $m=i,\ldots,N$, such that $D^m=1\}$ (6)

In the case of rows 1–4 of the comparator logic table $T^i[(k-1)\ldots (j+1)] > M^{i+1}[(k-1)\ldots (j+1)]$, and $M^i[j]=M^{i+1}[j]$.

Therefore $T^i[(k-1)\ldots j] > M^{i+1}[(k-1)\ldots j]$.

Hence, equations (1), (2), and (3) are all satisfied.

Row 5 represents an illegal combination of $C^i[j+1]$ and $E^i[j+1]$.

In the case of rows 6–9, $T^i[(k-1)\ldots (j+1)] < M^{i+1}[(k-1)\ldots (j+1)]$ (7)

and $M^i[j]=T^i[j]$. Therefore, it is also true that $T^i[(k-1)\ldots j] < M^{i+1}[(k-1)\ldots j]$, and $C^i[j]$ and $E^i[j]$ are set accordingly. In addition, $M^i[(k-1)\ldots (j+1)]=T^i[(k-1)\ldots (j+1)]$, as a result of Equation (7) and the induction hypothesis. Therefore, for $m=i,\ldots,N$, such that $D^m=1\}$, the following is true:

$M^i[(k-1)\ldots j]=T^i[(k-1)\ldots j]=\min\{2^k-1, T^i[(k-1)\ldots j], M^{i+1}[(k-1)\ldots j]\}=\min\{2^k-1, T^m[(k-1)\ldots j]\}$ (8)

In the case of rows 10–13

$T^i[(k-1)\ldots (j+1)]=M^{i+1}[(k-1)\ldots (j+1)]$.

Therefore, $T^i[(k-1)\ldots j]=M^{i+1}[(k-1)\ldots j]$ when $T^i[j]=M^{i+1}[j]$ in the case of rows 10 and 13;

$T^i[(k-1)\ldots j] < M^{i+1}[(k-1)\ldots j]$ when $T^i[j] < M^{i+1}[j]$ in the case of row 11; and $T^i[(k-1)\ldots j] > M^{i+1}[(k-1)\ldots j]$ when $T^i[j] > M^{i+1}[j]$ in the case of row 12.

Equations (1), (2), and (3) follow from this. By induction, therefore, they apply to the entire array of tags in the queue.

As a consequence, the smallest value i for which $C^i[0]=C^i$ also the entry for which $T^i[(k-1)\ldots 0]= \min\{2^k-1, T^m[(k-1)\ldots 0]$ for $m=i,\ldots,N$, such that $D^m=1\}$. Hence, this circuit selects the minimum tag by a fast linear search of the queue.

Note that two carry lines are necessary in this comparison circuit. With only a single line, it would not be possible to resolve the difference between at least one of the pairs of rows 7–8 or 11–12.

At to timing of the linear search in a VLSI implementation, a simple comparator of the type used between each queue entry in this design requires approximately 25 transistors per bit, or about 400 transistors for a 16-bit tag. To develop the value $M^1[0]$ requires the information from the selected destination bits to ripple through all N queue entries and across the k bits of each tag. This ripple forms a wave from the upper left corner to the lower right corner of the array. Note that it is not necessary to wait until the result of one comparison is completely developed before the first bit of the next lower queue entry is developed. Therefore, the longest path in the circuit passes through N+k bits.

In a 0.8 m CMOS implementation of the queue and search module, a simple comparator takes approximately 5.5 nanoseconds to compare two 16-bit quantities. An estimate, based on the nature of the circuit, suggests that it would take a similar amount of time for the j-th bit to ripple through 16 entries of the queue. Therefore, to select the smallest value from a queue of 128 entries, it appears that it would take about 128/16×5.5+5.5=49.5 nanoseconds.

While this is very fast, it does not scale very well with the length of the queue. A 256-entry queue would take almost twice as long.

Figure 4:
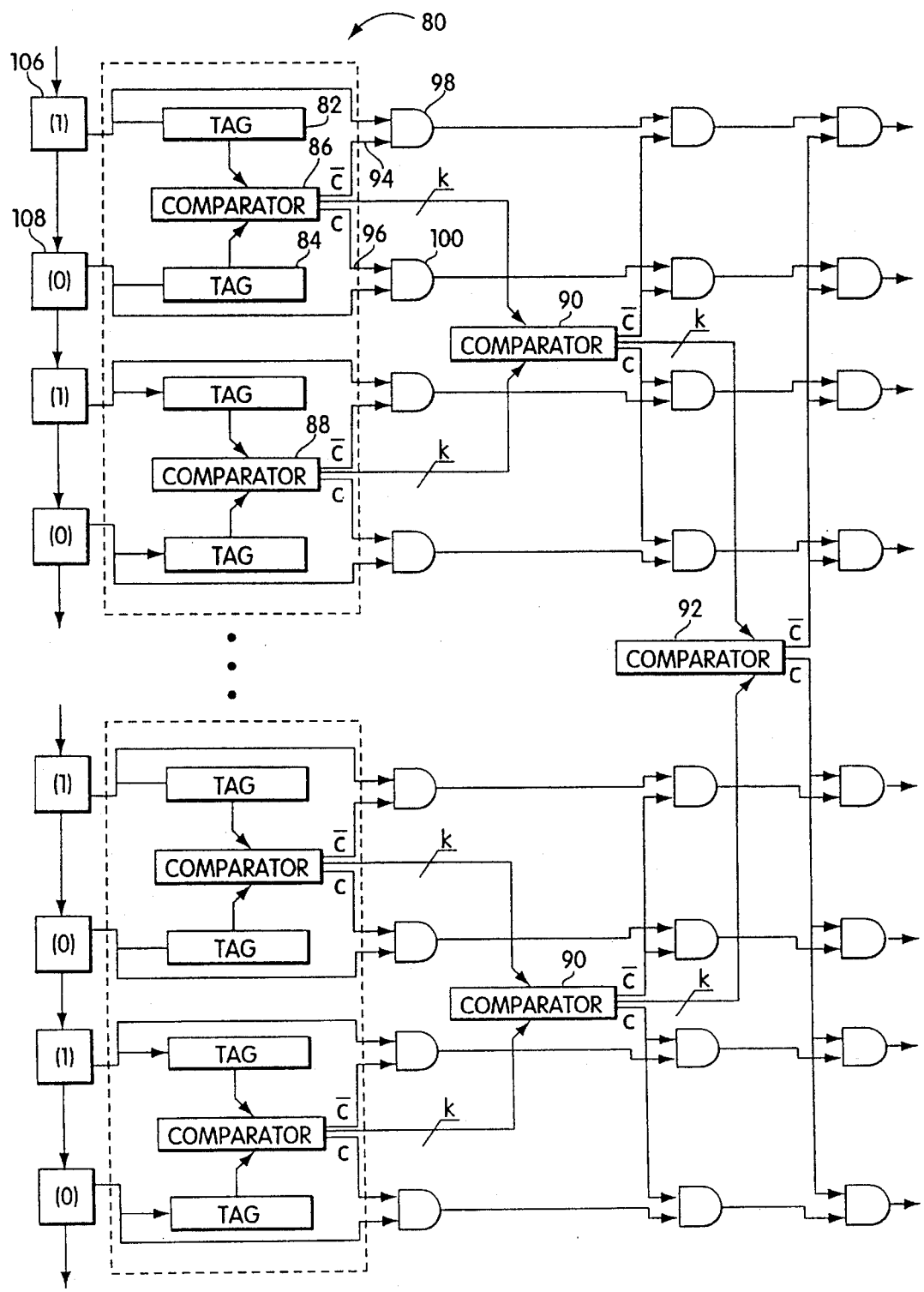
FIG. 4 is a schematic diagram illustrating eight queue entries of an alternative embodiment of the Subject System in which the linear search module of FIG. 3 is replaced by a logarithmic search module, also illustrating the scaling of the logarithmic search circuit to accommodate a larger number of queue entries.

To overcome the time required for a linear search of the queue, an alternative embodiment is possible in the form of a binary tree, as illustrated in FIG. 4. In this variation, there is one comparator between the tags of each pair of queue entries, the output of which feeds one side of a comparator at the next higher level. At each higher level, there is a comparator for each pair of comparators at the previous level. Therefore, for a queue of length $N=2^n$, there are $2^n-1$ comparators, the same as required by the linear case. FIG. 4 illustrates three levels of such a comparison tree.

Referring now to FIG. 4, a module 80 organizes the comparators in a binary tree type fashion, in which tag register 82 from one queue entry and tag register 84 from an adjacent queue entry are coupled to a comparator 86 which selects the smaller of the two tag values, provided that the selected entry has its selected destination bit set to one. If the two tag values are the same, the comparator 86 selects the one nearer the head of the queue. As a result of this construction, the time required to select the smallest tag from among all entries of the queue is proportional to the logarithm of the number of entries in the queue. For example, in a queue with 128 entries, the time for selecting the smallest tag is less than one half the time required by the linear search circuit of FIG. 3.

It will be noted that the outputs of comparator 86 and a subsequent comparator 88 are themselves provided to a comparator 90, with the output of comparator 90 then being applied to a comparator 92 in a tree like fashion.

Each comparator also has output bits 94 and 96, coupled respectively to AND gates 98 and 100 for the purpose of selecting the smallest tag. Each output bit from a comparator is AND'ed with the selected destination bit for the corresponding queue entry, so that if the output of the AND gate is one, this indicates firstly that the corresponding queue entry has a value of one in its selected destination bit, secondly that it has the smallest tag value in the subtree compromising the tags associated with that comparator, and thirdly that if two or more entries have the same smallest tag value the entry is the earliest of those with the same smallest tag. The comparators in the tree, along with the associated AND gates, therefore select the earliest queue entry for which the selected destination bit is one and the tag is the smallest value in the queue.

More particularly, each comparator at the leaves of the tree takes two k-bit inputs and generates a k-bit output containing the smaller of the two inputs, and a bit C which is one if and only if the lower of the two inputs (i.e., toward the head of the queue) is less than or equal to the upper one.

The complement of the destination bits are OR'ed with each tag in order to prevent small tag values from non-selected destinations from distorting the comparisons of tags from selected destinations. At each level in the tree, the k-bit output of the comparator is fed to one or the other input side of a comparator at the next level to the right, and C and $\bar{C}$ from the comparator are AND'ed with the selection output bits of the previous level. At the highest level, the selection output bits represent the result of the search. At most one selection output bit will be set to one, namely the bit corresponding to the queue entry with the smallest value and nearest the head of the queue. If no destination bits match, then no selection output bit is set.

The longest path in this binary tree comparator is k * $\log_2$ N, where N is the total number of entries in the queue. Using the same design rules as the linear circuit above, it is estimated that the total time to select the result from a 128-entry queue with 16-bit tags is 5.5×log 128=38.5 nanoseconds. This time will grow by only 5.5 nanoseconds for a queue which is twice as long.

Figure 5:
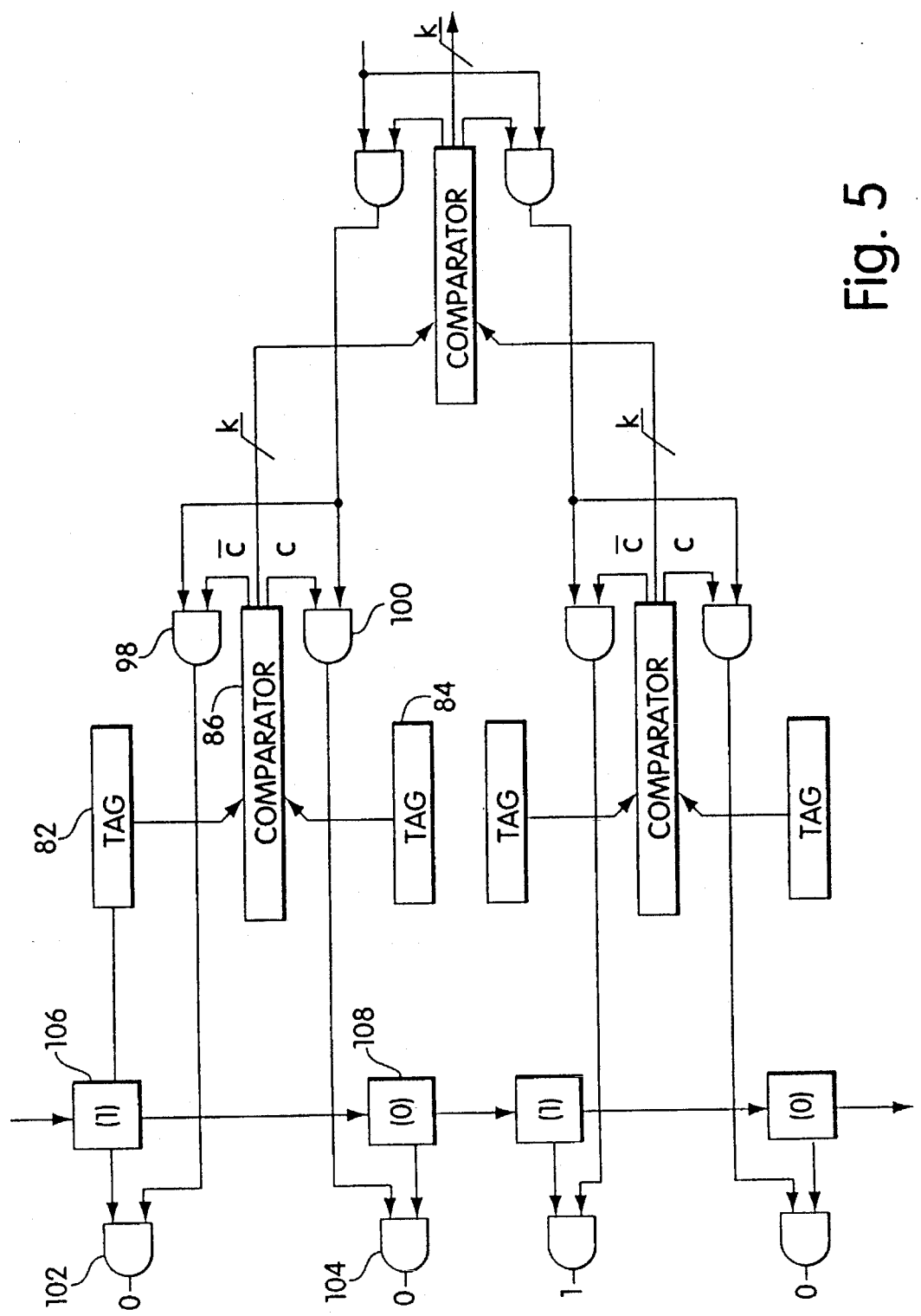
FIG. 5 is a schematic diagram illustrating an additional embodiment of the logarithmic module of FIG. 4 in which comparator outputs are folded back.

Note that the circuit as shown in FIG. 4 requires N * log N AND gates to select the output with the smallest tag. This number can be reduced to 2 * N by folding the C and $\bar{C}$ outputs from each comparator back to the next lower level. FIG. 5 shows this variation for two levels. In this figure, the selection outputs are now shown on the left instead of on the right. Note that this circuit takes slightly more time than that of FIG. 4 because the C and $\bar{C}$ must propagate back to the selection outputs. This extra time is the time of log N AND gates. Thus, the outputs of AND gates 98 and 100 are coupled to an input respectively of AND gate 102 and AND gate 104. The other inputs to these AND gates are the destination bits 106 and 108, as illustrated. These reference characters are reflected in FIG. 4.

Figure 6:
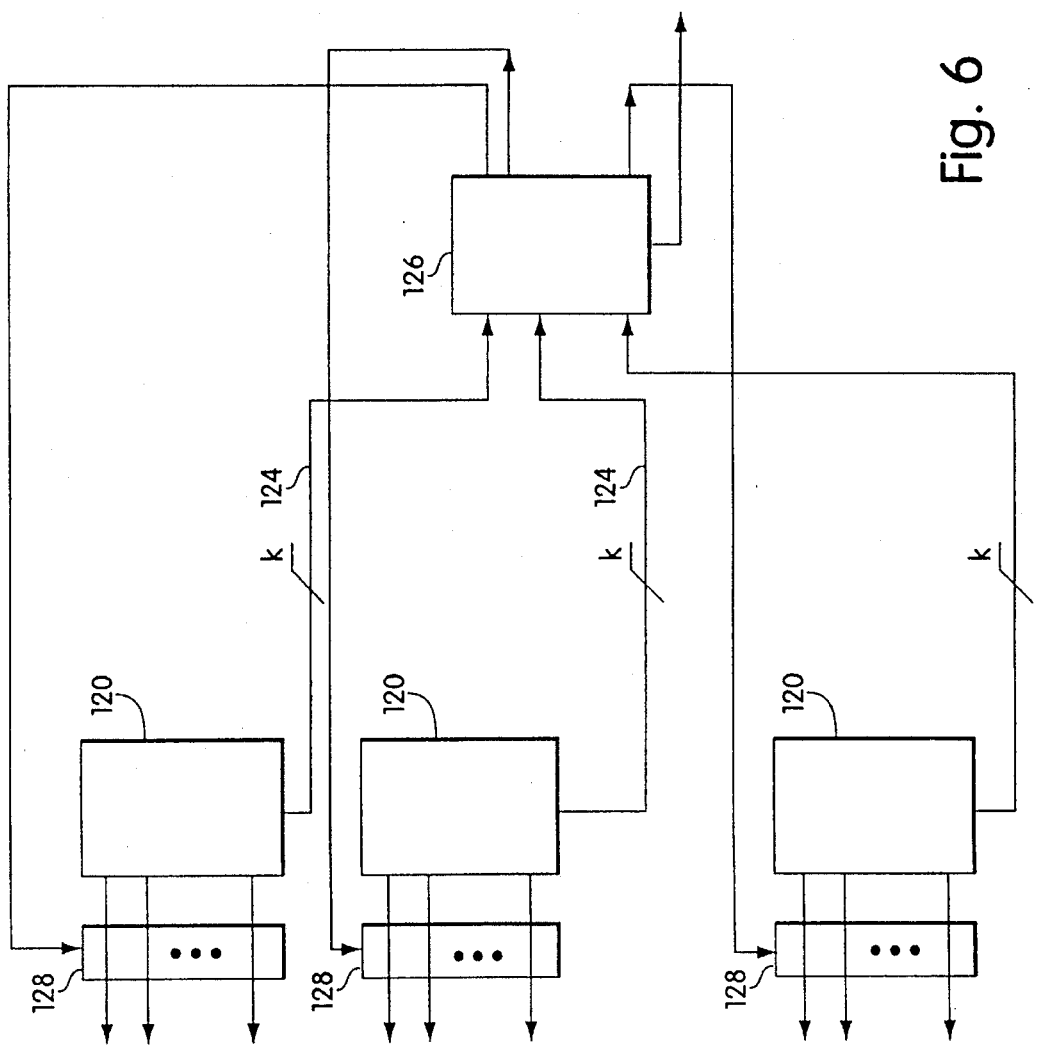
FIG. 6 is a block diagram illustrating an additional embodiment combining the linear search module of FIG. 3 with the logarithmic module of FIG. 5; and, FIG. 7 is a block diagram illustrating an individual element from the linear search module of FIG. 3.

While the above binary search technique is fast and requires the same number of comparators as the linear technique, another variation is faster in some cases. As seen in FIG. 6, a hybrid scheme is shown in which the queue is partitioned into groups 120 of L entries, each with its own linear search circuit of the form of FIG. 3. These groups are searched in parallel, each one producing the entry with the smallest tag from its own group. The respective outputs 124 from each group are coupled to another linear search circuit 126 to select the group with the smallest tag overall. The output from linear search circuit 126 comprises a set of bits, of which at most one will have the value one, namely the bit corresponding to the group with the smallest tag overall. These bits are then coupled back to an array of AND gates 128 associated with the linear search circuits 120. Each output bit of the linear search circuit 120 is AND'ed with the output bit of linear search circuit 126, so that the individual queue entry with the smallest tag and selected destination bit of one is finally selected.

More particularly, a hybrid scheme is described in which groups of L entries are compared in parallel by the linear scheme, and the results of these are compared at a higher level, also in groups of L. Thus, each group produces a k-bit value representing the smallest tag in its group, plus a set of L selection output lines. The selection output lines of a non-terminal group in the tree are folded back and AND'ed with all of the selection output lines of the next lower level group. Hence, a selection output line from a leaf group will be one only if its tag is the smallest of its own group as well as the smallest of all higher level groups.

Since the longest path in each group is k+L, and there are $\log_L$ N groups, the entire circuit produces its final result in time proportional to (k+L+1) * $\log_L$ N. For example, if a 16-bit comparator takes 5.5 nanoseconds, then a single 16-entry group will require about 2 * 5.5=11 nanoseconds to search. A queue of $16^2$=256 entries needs only twice this amount, or about 22 nanoseconds. Note that the total number of comparators in the tree is still of the order of $2^n$, independent of the value of L.

It will be appreciated that any of the tree architectures can be pipelined if necessary for additional speed, but at the cost of additional circuit complexity. Each level of comparator represents a stage in the pipeline. In one cycle, a set of destination bits is selected and the results of all of the first level comparators are formed. These are then gated to the next level. Then in the next cycle, a new set of destination bits are selected for the first level, while the second level compares the outputs of the previous pipeline stage. After $\log_N$ cycles, the selection output bits from the first set of destinations will emerge. In each cycle thereafter, the result of a new set of destinations will emerge. By this means, the selection of one output for each destination can be accomplished in much less than one ATM cell time.

In terms of implementations of scheduling algorithms, the tag-based search operation provided by this queuing system is very flexible and can be used to implement a wide variety of static or dynamic scheduling policies and mechanisms, as follows:

For Simple priority and Rate Monotonic scheduling, the tag value is assigned statically by virtual channel. That is, when a channel is set up, its priority is determined, and every cell that arrives on that channel is assigned the same tag value. Smaller tags correspond to higher priority and hence to preference in scheduling. The tag-based search supports $2^k$ levels of priority or rate resolution.

Most ATM switches support some sort of priority scheduling, but the number of priority levels is very small, typically of the order of two or four. There is growing evidence that considerably more priority levels are needed for the flexibility of scheduling a large number of different kinds of tasks in the same network environment. In particular, rate monotonic algorithms sort all repetitive real-time tasks by their frequencies of repetition. Tasks with higher frequencies are assigned higher priority. Sufficient resolution is required to support multiple kinds of tasks.

Virtual Clock and Weighted Fair Queuing scheduling are simple dynamic scheduling algorithms. When a cell arrives at the ATM switch, a tag is computed based on the arrival time and the state of the virtual channel. Each cell for the same virtual channel gets a different tag. The kinds of Quality of Service guarantees are a function of the algorithm used to compute each tag.

As to the Earliest Deadline First scheduling algorithm, this is the most General of all scheduling algorithms. It has been proved that if a set of real time tasks can be scheduled by any method, they can also be scheduled by the Earliest Deadline First algorithm. Like the Virtual Clock and Weighted Fair Queuing algorithms, it is a dynamic scheduling algorithm in which a tag value is computed for each cell from its arrival time and the state of the virtual channel. Tags correspond to deadline values.

Finally, Round robin algorithms are typically considered to be much easier to implement in software than in hardware. However, it is possible to implement it with the Subject tag-based search by treating it as another dynamic scheduling algorithm. To do so, one maintains a Global counter R across all virtual channels. The value of R records the rounds that have been processed. For each virtual channel v, one maintains in addition a value $r_v$ indicating the round number of its last received cell. When a new cell is received, the tag is set to $$\text{tag}_{cell} = \text{new}\_r_v = \max\{R, \text{old}\_r_v\} + 1$$

Then the item is inserted into the queue with this tag. When it is time to dispatch a cell, the cell with the smallest tag is selected. Whenever the tag of a selected cell of a Round Robin channel is Greater than R, the value of R is updated to the value of the tag.

Note that with all dynamic scheduling algorithms, tags are increasing functions of time according to some arbitrary real time clock; eventually computation of the tag values will over-flow k–1 bits. When this happens, all tag values of entries in the queue will have a value of one in the high order (i.e., k-th) bit of the tag field, provided that k is large enough. To prevent further overflow, one simply resets all of these bits to zero and continues. This is equivalent to precessing the logical or virtual clock by a value of $2^{k-1}$ every $2^{k-1}$ units of time. More particularly, when all tag values of entries remaining in the queue exceed $2^{k-1}$ and all new tag values are also greater than $2^{k-1}$, then resetting the high-order bit of the tag field of every queue entry has the effect of diminishing all existing and future tag values by $2^{k-1}$ without changing the order of entries in the queue.

In a practical network, it is necessary to use some real time scheduling algorithm for the traffic requiring guaranteed delivery within a certain set of parameters, but some other algorithm for fair and best-effort scheduling of traffic which does not require guaranteed delivery. This can easily be supported by using the high order bits of the tags. As an example, considering the virtual channels in a particular switch to be partitioned into C classes, with each class being of higher priority than the next one, then the classes can be encoded into the high order $\log_2 C$ bits of the tag, with the highest priority class having the smallest value in these bits. As a result, the Subject tag-based search system will always select from the class with the highest priority; and within that class, it will select the queue entry with the smallest tag.

In summary, a digital communication network switch utilizes a general-purpose queuing system. This system is based on the notion of searching a queue for the qualifying entry with the smallest tag. With such a system, it is possible to implement a broad class of scheduling algorithms to support applications requiring real time guarantees, continuous media such as audio or video, and applications requiring predictably rapid response. It is also possible to implement multiple scheduling algorithms in the same switch at the same time, so that different classes of traffic can be supported according to different disciplines. This system is also programmable, in the sense that the method of computation of tags assigned to ATM cells can be implemented in software to execute on fast, programmable microprocessors attached to each input and/or output port. This system provides a new level of flexibility in implementing ATM networks in a variety of research and prototype environments. It also allows system implementors to concentrate on the requirements of their applications rather than having to wrestle with the nature and predictability of network service.

Having above indicated several embodiments of the Subject Invention, it will occur to those skilled in the art that modifications and alternatives can be practiced within the spirit of the invention, both in ATM networks and in other kinds of digital communication networks. It is accordingly intended to define the scope of the invention only as indicated in the following claims.

We claim:

1. A switching system for a digital communication network, comprising:

a switch having a plurality of input links and a plurality of output links, each input link being adapted to receive incoming cells of data, with each incoming cell having a header field containing information indicating one or more destinations in the network for said incoming cell;

means for translating destination information in said
   header field into a vector of destination bits, with each
   bit in said vector representing one output link, and with
   a value of one in said bit representing that said cell is
   to be transmitted over the corresponding output link in
   order to reach its final destination;

means for annotating each of said incoming cells with
   said vector of destination bits translated from said
   destination information in said header field of said
   incoming cell so as to provide an annotated cell;

means for coupling said annotated cells to one or more
   selected outputs links, said coupling means including means for queuing said annotated cells in the order
   received;

means for selecting incoming cells from said queuing
   means for transmission in other than the order received,
   said selecting means for each output link selecting only
   incoming cells with corresponding destination bit values of one, said selecting means including means for scheduling the
   transmission of incoming cells comprising means for
   storing an algorithm for determining the order of selection, means for configuring said algorithm prior to
   operation of said switch and for reconfiguring said
   algorithm during operation of said switch, and means
   for executing said algorithm for each output link within
   the time required to transmit one of said incoming cells
   over said output link; and, means for transmitting selected incoming cells over said
   output links, whereby said switch can implement any
   computable function for complete switch flexibility to
   accommodate a broad class of algorithms providing for
   the timely delivery of cells or packets for which timeliness criteria have been established and for subsequent
   delivery of cells or packets for which no timeliness
   criteria have been established.

2. The switching system of claim 1, wherein said means
for transmitting selected incoming cells includes means for
transmitting incoming cells without annotations.

3. The switching system of claim 1, wherein said algorithm is includes either a dynamic priority scheduling algorithm, or a static priority scheduling algorithm, or a static
priority scheduling algorithm, or a round robin algorithm.

4. The switching system of claim 1 wherein said scheduling means includes means for annotating each of said
incoming cells with a numerical tag value in terms of a
number calculated in accordance with a configured scheduling algorithm such that the tag values represent the order
in which cells are to be selected from the queuing means for
transmission, thus to determine the order of cell transmission to each output link, and wherein said means for
selecting incoming cells for transmission over an output link
includes means for searching said queuing means according
to tag value and value of corresponding destination bit, such
that the selected cell has the lowest tag value among all cells
awaiting transmission for which the corresponding destination bit is one, and such that if more than one such cell or
packet has the same lowest tag value, the cell having arrived
first is selected.

5. The switching system of claim 4 wherein said queuing
means includes a FIFO circuit of registers having a head and
a tail, each register representing one cell of data awaiting
transmission, each register containing annotations of said
one cell including the vector of destination bits for said one
cell and a binary encoding of the numerical tag value for said
one cell, and such that each register of said FIFO circuit
represents a cell to have arrived later in time than any cell
represented by a register nearer the head of said FIFO
circuit.

6. The switching system of claim 5 wherein said means
for searching said queuing means includes:

a plurality of comparison circuits, equal in number to the
   number of registers in said FIFO circuit, with one
   comparison circuit being associated with each of said
   registers in said FIFO circuit, said comparison circuits
   being organized in linear fashion such that each of said
   comparison circuits compares the tag value of its
   associated register with the output value of the comparison circuit associated with the next register toward
   the tail of said FIFO circuit, each comparison circuit
   emitting an output bit of one if and only if the tag value
   of its associated register is lower than the tag value
   derived from the next comparison circuit toward the tail
   of said FIFO circuit and if and only if the destination bit
   for the output link being selected is one, whereby each
   comparison circuit carries the lowest tag value for the
   output link being selected to the next comparison
   circuit toward the head of said FIFO circuit, thus to
   provide cell selection in time which is a linear function
   of the number of entries in the queue.

7. The switching system of claim 5 wherein said means
for searching said queuing means includes:

a plurality of comparison circuits, equal in number to half
   the number of registers in said FIFO circuit plus
   additional comparison circuits, said comparison circuits being organized in hierarchical fashion to form a
   binary tree having leaves, branches, and a root, subsets
   of said leaves and branches forming subtrees, such that
   each comparison circuit at the leaves compares the tag
   value of two adjacent registers in said FIFO circuit and
   identifies which of said two registers has the smaller tag
   value, each of said additional comparison circuits comparing the tag values of two subtrees and identifying
   the subtree having the register with the lowest tag value
   for the output link being selected, whereby the tree of
   comparison circuits carries the lowest tag value for the
   output link being selected to the root in time which is
   proportional to the logarithm of the number of entries
   in the queue.

8. A switching system for a digital communication network, comprising:

a switch having a plurality of output links and a plurality
   of input links, each input link adapted to receive
   incoming cells of data, with each cell having an address
   for designating an output link, means for converting
   said address into a destination bit, and means for
   coupling cells at an input link to at least one selected
   output link, said coupling means including means for
   scheduling the transmission of cells of data from an
   input link to an output link comprising;

means for tagging each of said cells with a tag having a
   tag value in terms of a number generated in accordance
   with a predetermined scheduling algorithm such that
   the tag values represent the order in which cells are to
   be transmitted, thus to determine the order of cell
   transmission to an output link;

a common queue;

means for inserting the tag value for a cell along with its
   associated destination into said common queue;

means for searching said queue by destination bit and tag
   value for the cell with the smallest tag value for the
   corresponding destination; and, means for transmitting the cell having the smallest tag value to the output link corresponding to said destination, whereby tag values can be provided according to any function.

9. The switching system of claim 8 wherein said searching means includes linear search means including means for evaluating the smallest tag serially.

10. The switching system of claim 8 wherein said searching means includes logarithmic search means including means for evaluating pairs of cells simultaneously in a tree type structure to reduce processing time.

11. The switching system of claim 8 wherein said searching means includes logarithmic search means.

12. The switching system of claim 8 wherein said means for tagging said cells includes, a series of tag registers arranged to establish a queue having a head and a tail;

a plurality of comparators;

means for coupling a tag register to a corresponding comparator;

means for storing a cell such that said stored cell is identified as being associated with a corresponding tag register; and, means for providing each of said tag registers with a number reflecting the tag value for the corresponding stored cell, said comparators comparing the tag value of the register associated therewith with the output of the next previous comparator for determining the smaller of the two numbers, and for outputting a number corresponding to the smaller of said two numbers and a destination bit; and, means responsive to both the smaller of said two numbers and said destination bit for identifying the associated stored cell.

13. The switching system of claim 12 wherein each of said comparators has an output in the form of a series of bits, with the value of one for a particular bit of said series of bits from a comparator indicating that the destination bit for the corresponding stored cell is one and that the tag value for the corresponding stored cell is smaller than the tag value of all other stored cells toward the tail of the queue for which the destination bit is also one, whereby each of said comparators compares each tag value with the minimum value of the other tags toward the tail of the queue to establish priority for each cell for a destination.

14. The switching system of claim 12 wherein each of said comparators includes means for comparing two tag values and for outputting a number corresponding to the smaller of the two inputted tag values, the output of said comparator being conditioned upon the existence of additional input bits, one additional input bit for each tag value, with said additional input bits establishing that a tag value qualifies for comparison.

15. The switching system of claim 14 wherein each additional input bit specifies for the tag value of the corresponding stored cell if said corresponding stored cell has a destination bit of one.

16. The switching system of claim 12 and further including means if two or more cells have the same lowest tag value for selecting for transmission the cell nearest the head of the queue.

17. The switching system of claim 8 wherein said means for tagging includes a hierarchial tree type structure having leaves descending via branches to a root, with each branch of the tree including a pair of tag registers, a comparator coupled between adjacent tag registers to form a tag register pair comparator and an additional comparator having inputs coupled to the outputs of the two associated tag register pair comparators, said additional comparator including means for identifying the stored cell associated with the tag registers coupled thereto having the smaller of the two tag values, provided that said last-mentioned stored cell has a destination bit of one.

18. The switching system of claim 17 wherein each of said tag register pair comparators output both the smaller tag value and two comparison bits, one comparison bit indicating that one associated stored cell has the smaller tag value and the other comparison bit indicating that the other associated stored cell has the smaller tag value and wherein said selecting means includes AND gates responsive to a destination bit and a comparison bit for identifying the cell having the smaller of said tag values, said AND gates having outputs such that at the root of the tree one and only one AND gate will have a one output, thus indicating the stored cell to be transmitted to the destination link.

19. The switching system of claim 18 wherein said AND gates are used to determine if an associated cell has the appropriate destination bit, each of said tag register pair comparators having an output bit coupled to a different AND gate such that each output bit from a comparator is ANDed with the destination bit for a corresponding stored cell and such that if the output of the corresponding AND gate is one, the corresponding stored cell has a destination bit with a value of one, and has the smallest tag value of the tags associated with said comparator.

20. The switching system of claim 19 and further including means, if two or more cells have the smallest tag value, for identifying the stored cell that is the earliest of those with the smallest tag, whereby the stored cell which is identified is the earliest cell for which the destination bit is one and the tag is the smallest value.

21. The switching system of claim 17 wherein said comparators define a vertical queue having a head and a tail, and wherein each additional comparator has two inputs and an output containing the smaller of the two inputs thereto plus an output which has a value of one if and only if the lower of the two inputs towards the head of the queue is less than or equal to the upper of said two inputs.

22. The switching system of claim 17, and further including:

means at a higher level in the tree towards the root thereof for determining which of the branches of a lower level of tree has the lower tag and for identifying that branch having the lower tag, said last mentioned means including an AND gate for each tag for ANDing the associated destination bit of the tag with a bit indicating if the associated tag has the lowest value for all of the tags, such that no additional AND gates are required for each tag to carry destination bit information from the tag to the root of the tree, thereby to reduce the number of AND gates required for identification of the smaller tag value.

* * * * *